United States Patent
Ozaki

(10) Patent No.: US 8,842,192 B2
(45) Date of Patent: Sep. 23, 2014

(54) IMAGE PROCESSING APPARATUS, IMAGE PROCESSING METHOD, AND IMAGING APPARATUS FOR PERFORMING IMAGE PROCESSING AND CODING OF A PREPROCESS IMAGE

(75) Inventor: Koji Ozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 418 days.

(21) Appl. No.: 13/332,850

(22) Filed: Dec. 21, 2011

(65) Prior Publication Data

US 2012/0182439 A1 Jul. 19, 2012

(30) Foreign Application Priority Data

Jan. 18, 2011 (JP) ................. 2011-007687

(51) Int. Cl.
*H04N 5/228* (2006.01)
*G06K 9/36* (2006.01)
*H04N 19/60* (2014.01)
*H04N 19/124* (2014.01)
*H04N 19/172* (2014.01)
*H04N 19/149* (2014.01)
*H04N 19/85* (2014.01)
*H04N 19/196* (2014.01)
*H04N 19/167* (2014.01)
*H04N 19/176* (2014.01)
*H04N 19/117* (2014.01)

(52) U.S. Cl.
CPC ... *H04N 19/00903* (2013.01); *H04N 19/00775* (2013.01); *H04N 19/0009* (2013.01); *H04N 19/00248* (2013.01); *H04N 19/00278* (2013.01); *H04N 19/00266* (2013.01); *H04N 19/00066* (2013.01); *H04N 19/00181* (2013.01); *H04N 19/00369* (2013.01)
USPC ........................................ 348/222.1; 382/232

(58) Field of Classification Search
None
See application file for complete search history.

(56) References Cited

U.S. PATENT DOCUMENTS

| 7,848,582 | B2 | 12/2010 | Ozaki | |
|---|---|---|---|---|
| 2008/0123970 | A1* | 5/2008 | Ozaki et al. | 382/232 |
| 2010/0260428 | A1* | 10/2010 | Ueno et al. | 382/232 |
| 2011/0141308 | A1* | 6/2011 | Taoka | 348/222.1 |

FOREIGN PATENT DOCUMENTS

| JP | 2003-51748 | 2/2003 |
|---|---|---|
| JP | 2007-158884 | 6/2007 |

* cited by examiner

*Primary Examiner* — Justin P Misleh
(74) *Attorney, Agent, or Firm* — Oblon, Spivak, McClelland, Maier & Neustadt, L.L.P.

(57) ABSTRACT

An image processing apparatus that performs image processing and coding of a preprocess image, which is part of an input image, to obtain information for coding the input image. The image processing includes processing the input image such that a size of an unprocessed image necessary for obtaining a processed image is varied depending on a position of the unprocessed image in the input image. Before processing the input image, image processing is performed on a preprocess image which is part of the input image to acquire necessary information for coding the input image. The preprocess image is determined in such a manner as to reduce the size of the unprocessed image necessary for obtaining the processed preprocess image.

9 Claims, 23 Drawing Sheets

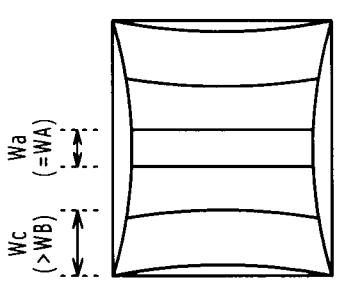
FIG. 1A  PROCESSED IMAGE
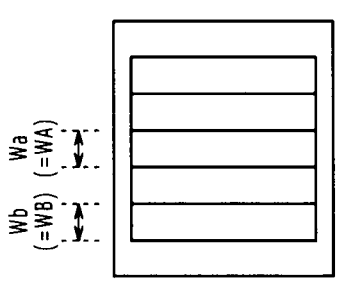
FIG. 1B  UNPROCESSED IMAGE (NOT DISTORTED)
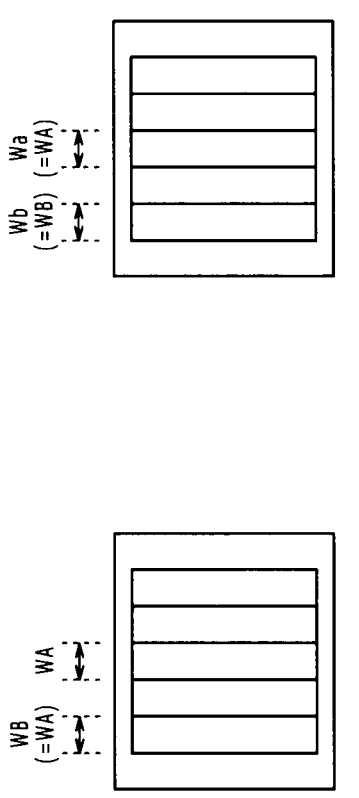
FIG. 1C  UNPROCESSED IMAGE (DISTORTED)

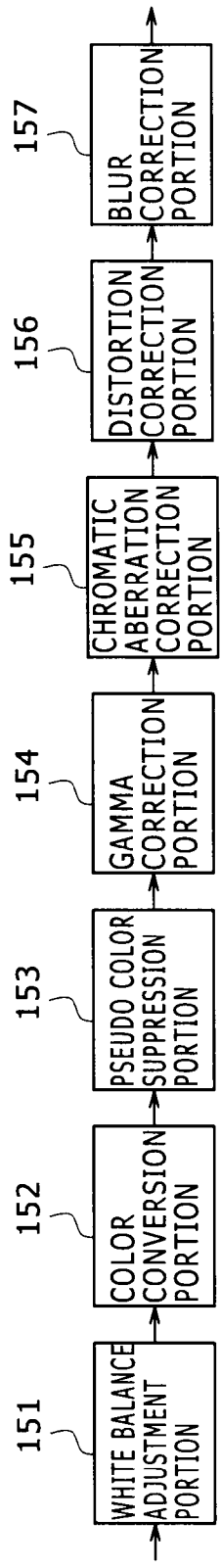
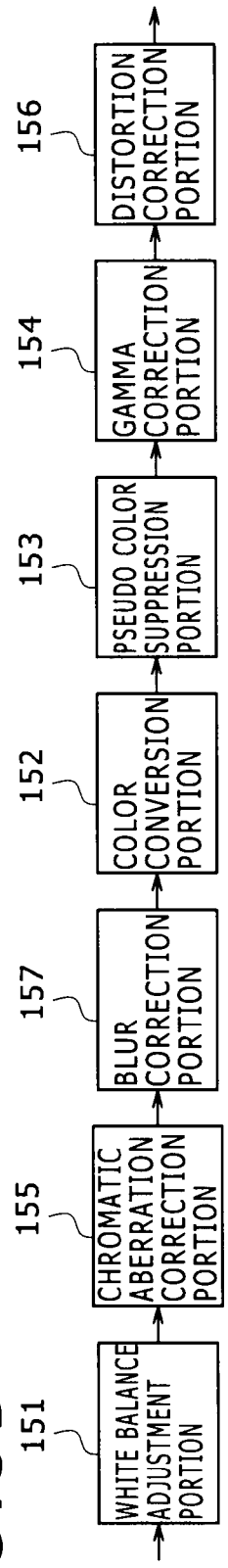
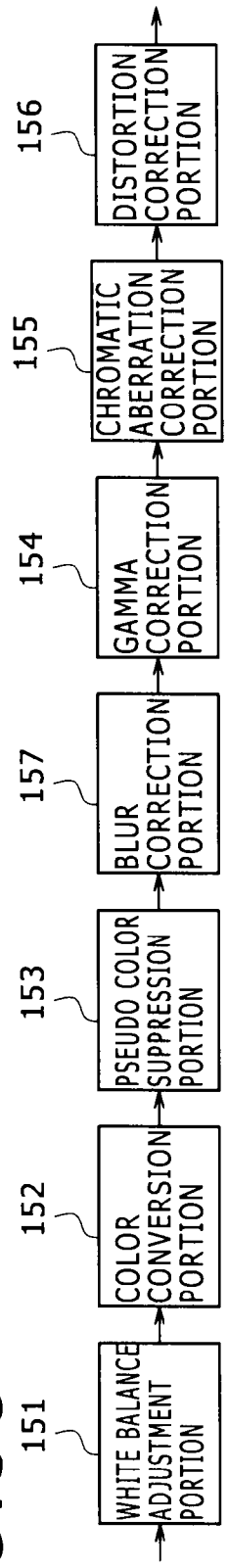

FIG. 8A

| | 8 | 16 | 24 | 32 | 40 | 48 |
|---|---|---|---|---|---|---|
| | 7 | 15 | 23 | 31 | 39 | 47 |
| 1 | 2 | 3 | 4 | 5 | 6 | |
| 9 | 10 | 11 | 12 | 13 | 14 | |
| 17 | 18 | 19 | 20 | 21 | 22 | |
| 25 | 26 | 27 | 28 | 29 | 30 | |
| 33 | 34 | 35 | 36 | 37 | 38 | |
| 41 | 42 | 43 | 44 | 45 | 46 | |

FIG. 8B

GAp8: 8, 16, 24, 32, 40, 48

GAp2: 2, 10, 18, 26, 34, 42
GAp4: 4, 12, 20, 28, 36, 44
GAp6: 6, 14, 22, 30, 38, 46

FIG. 8C

GAp7: 7, 15, 23, 31, 39, 47

GAp1: 1, 9, 17, 25, 33, 41
GAp3: 3, 11, 19, 27, 35, 43
GAp5: 5, 13, 21, 29, 37, 45

| | 7 | 8 |
|---|---|---|
| | 15 | 16 |
| | 23 | 24 |
| | 31 | 32 |
| | 39 | 40 |
| | 47 | 48 |

| 1 | 2 | 3 | 4 | 5 | 6 |
| 9 | 10 | 11 | 12 | 13 | 14 |
| 17 | 18 | 19 | 20 | 21 | 22 |
| 25 | 26 | 27 | 28 | 29 | 30 |
| 33 | 34 | 35 | 36 | 37 | 38 |
| 41 | 42 | 43 | 44 | 45 | 46 |

FIG.13B

| 8 | 16 | 24 | 32 | 40 | 48 |

FIG.13C

| 2 | 10 | 18 | 26 | 34 | 42 |

FIG.16A FIG.16B FIG.16C FIG.16D FIG.16E

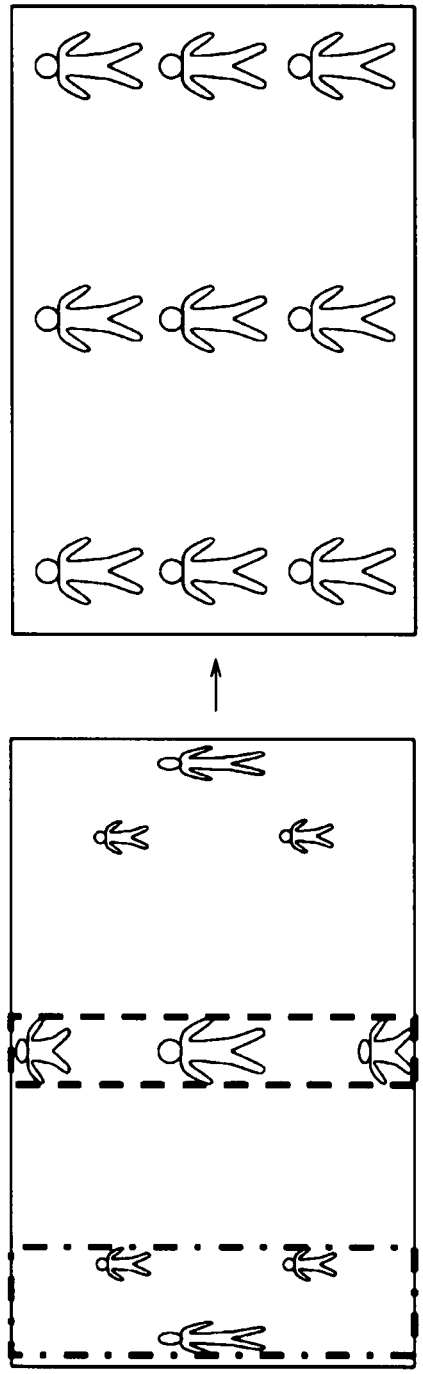

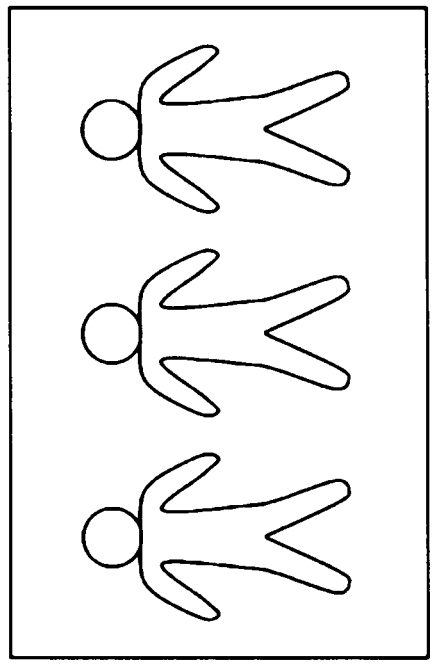
FIG.20A
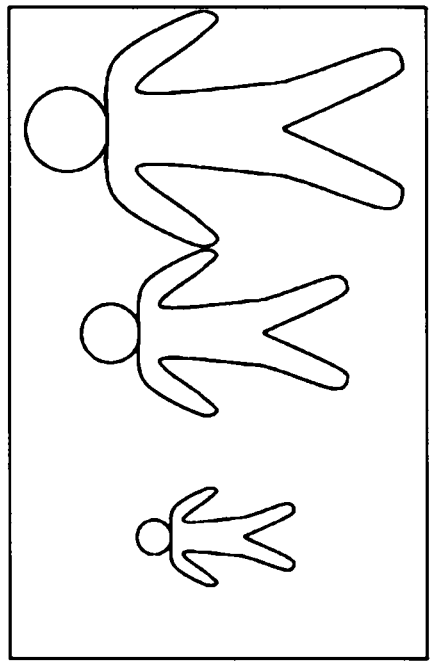
FIG.20B

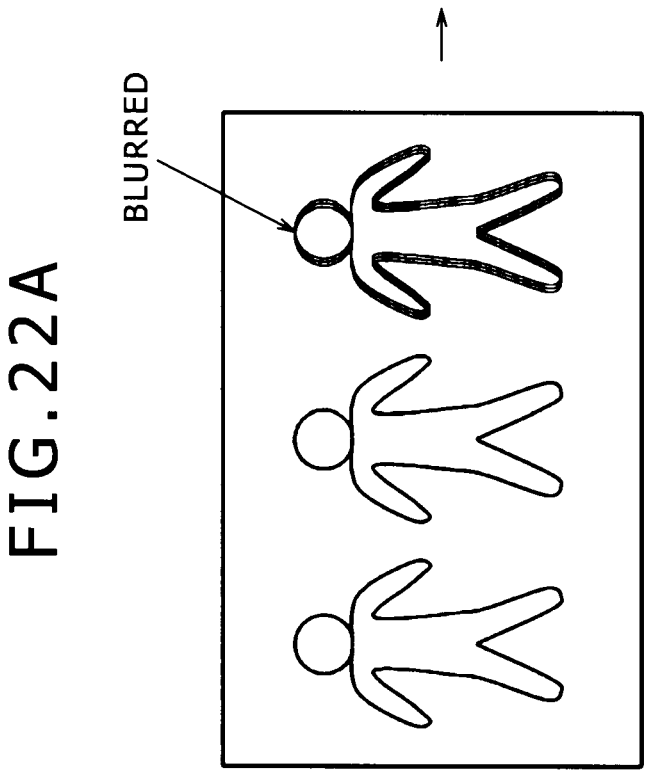

IMAGE PROCESSING APPARATUS, IMAGE PROCESSING METHOD, AND IMAGING APPARATUS FOR PERFORMING IMAGE PROCESSING AND CODING OF A PREPROCESS IMAGE

BACKGROUND

The present disclosure relates to an image processing apparatus, an image processing method, and an imaging apparatus.

Ordinarily, imaging apparatuses such as digital still cameras perform preprocessing such as the process of correcting distorted images, the process of correcting chromatic aberration, and the process of enlarging or reducing the size of images. Also, using coding methods such as JPEG (Joint Photographic Experts Group), the imaging apparatuses reduce the amount of the data obtained through preprocessing.

Coding involves extracting part of the data targeted to be encoded, coding the extracted data for an estimate, and changing coding parameters based on the amount of the coded data, whereby the entire data is coded, as described for example in Japanese Patent Laid-open No. 2003-051748. Coding also involves extracting part of the target data to be coded to obtain direct current (DC) components beforehand in order to enhance the efficiency of coding, as described for example in Japanese Patent Laid-open No. 2007-158884.

SUMMARY

When part of an input image is coded for preprocessing (the partial image is called the preprocess image hereunder), the amount of image data read out through preprocessing may be different between two cases, one in which the image is distorted and the other in which the image is not distorted. FIG. 1A shows a typical image that has been corrected for distortion through image processing. FIG. 1B shows a typical unprocessed image that is not corrected in image processing for lack of distortion. FIG. 10 shows a typical unprocessed image to be corrected through image processing for lens distortion.

Where there is no distortion as shown in FIG. 1B, the size of a preprocess image preceding image processing and necessary for eventually setting the preprocess image following image processing and destined for a coding portion during preprocessing to a predetermined size such as one serving as a unit of processing for coding, turns out to be the same no matter where the preprocess image is positioned in the input image. That is, wherever the preprocess image is positioned in the input image, the amount of read image data is the same. For example, if an area WA for the preprocess image is set at the center as shown in FIG. 1A, a center area Wa (=WA) of the input image may be taken as a preprocess read area of which the image may be used, as shown in FIG. 1B. If an area WB for the preprocess image is set at an edge with the same width as the area WA as shown in FIG. 1A, then an edge area Wb (=WB) of the input image may be taken as a preprocess read area of which the image may be used, as shown in FIG. 1B.

However, when the image is distorted as shown in FIG. 1C, the amount of read image data may vary depending on position of the preprocess read area. For example, if the area WA for the preprocess image is set at the center, the center area Wa (=WA) of the input image may be taken as the preprocess read area of which the image may be used. But since the edge portion of the image is distorted, an area We wider than the area WB (>WB) needs to be set for the preprocess read area. Otherwise the preprocess image of the area WB following image processing cannot be obtained. Thus there are cases in which the amount of read image data varies depending on position of the preprocess image. The problem is that when the amount of read data is increased, processing time and power consumption increase correspondingly.

The present disclosure has been made in view of the above circumstances and provides an image processing apparatus, an image processing method, and an imaging apparatus for performing image processing and coding of a preprocess image which is part of an input image to obtain necessary information for coding the input image beforehand while reducing processing time and power consumption, for example.

According to one embodiment of the present disclosure, there is provided an image processing apparatus including: an image processing portion configured to perform image processing on an input image in such a manner that during the image processing, size of an unprocessed image necessary for obtaining a processed image is varied depending on position of the unprocessed image in the input image; a coding portion configured to code the processed image output from the image processing portion; and a preprocessing instruction portion configured such that before image processing and coding of the input image, the preprocessing instruction portion instructs the image processing portion to perform image processing on a preprocess image which is part of the input image and sends the processed preprocess image to the coding portion to acquire necessary information for coding the input image beforehand, wherein the preprocessing instruction portion determines the preprocess image in such a manner as to reduce the size of the unprocessed image necessary for obtaining the processed preprocess image.

The image processing portion of the disclosed image processing apparatus carries out image processing in which size of the unprocessed image necessary for obtaining the processed image is varied depending on position of the unprocessed image in the input image. For example, the image processing portion may perform image processing including a process of bringing to the same size images having scaling factors varying with color components, a process of bringing to the same size images having scaling factors varying with image positions, a process of applying a filter having a tap count varying with image positions, and a process of correcting an image distortion caused by a lens. The coding portion codes the processed image output from the image processing portion using, for example, the JPEG method. Before coding, the preprocessing instruction portion instructs the image processing portion to carry out image processing on the preprocess image which is part of the input image and sends the processed preprocess image to the coding portion to acquire necessary information for coding the input image beforehand. For example, the preprocessing instruction portion may obtain a code amount as information necessary for coding. If the coding portion codes a previous value difference in a predetermined coding order, the preprocessing instruction portion may obtain beforehand the previous value for calculating the previous value difference. Furthermore, the preprocessing instruction portion determines the preprocess image in such a manner as to reduce the size of the unprocessed image necessary for obtaining the processed preprocess image. That is, the preprocessing instruction portion may select as the area for the preprocess image the position in the screen where the amount of read image data necessary for obtaining the preprocess image is small. During preprocessing where information necessary for coding is obtained beforehand using the area of the unprocessed image necessary for obtaining the preprocess image as a preprocess read area, the image data of the preprocess read area is read out and subjected to image processing and coding. Moreover, if the coding portion codes the input image in an order different from a predetermined coding order, a reordering portion may be provided to reorder codes output from the coding portion into the predetermined coding order.

According to another embodiment of the present disclosure, there is provided an image processing method including: performing image processing on an input image in such a manner that during the image processing, size of an unprocessed image necessary for obtaining a processed image is varied depending on position of the unprocessed image in the input image; coding the processed image following the image processing; prior to the coding, performing image processing and coding on a preprocess image which is part of the input image to acquire necessary information for coding the input image beforehand; and during the preprocessing, determining the preprocess image in such a manner as to reduce the size of the unprocessed image necessary for obtaining the processed preprocess image.

According to a further embodiment of the present disclosure, there is provided an imaging apparatus including: an imaging portion configured to generate a taken image; an image processing portion configured to perform image processing on the taken image in such a manner that during the image processing, size of an unprocessed image necessary for obtaining a processed image is varied depending on position of the unprocessed image in the taken image; a coding portion configured to code the processed image output from the image processing portion; and a preprocessing instruction portion configured such that before image processing and coding of the taken image, the preprocessing instruction portion instructs the image processing portion to perform image processing on a preprocess image which is part of the taken image and sends the processed preprocess image to the coding portion to acquire necessary information for coding the taken image beforehand, wherein the preprocessing instruction portion determines the preprocess image in such a manner as to reduce the size of the unprocessed image necessary for obtaining the processed preprocess image.

According to the present disclosure outlined above, before image processing and then coding of an input image, preprocessing is carried out in which a preprocess image which is part of the input image is processed and coded so as to obtain information necessary for coding the input image beforehand. The preprocessing involves determining the preprocess image in such a manner as to reduce the size of the unprocessed image necessary for obtaining the processed preprocess image. This makes it possible through the preprocessing to lower the amount of the data read from the input image for image processing, whereby processing time and power consumption are reduced, among others.

BRIEF DESCRIPTION OF THE DRAWINGS

FIGS. 1A, 1B and 1C are explanatory views showing how the amount of image data read during preprocessing typically differs between two cases, one in which a target image is distorted and the other in which the image is not distorted;

FIGS. 3A, 3B and 3C are schematic views showing typical internal structures of an image processing portion;

FIGS. 8A, 8B and 8C are schematic views showing a code amount estimation in which the right side of a taken image has a large distortion and the left side thereof has a small distortion;

FIGS. 9A, 9B and 9C are schematic views showing a code amount estimation in which the upper part of a taken image has a large distortion and the lower part thereof has a small distortion;

FIGS. 13A, 13B and 13C show an example of preprocessing in which the right side of a taken image has a large distortion and the left side thereof has a small distortion;

FIGS. 16A, 16B, 16C, 16D and 16E are schematic views showing image processing and a coding operation using the block "2" column as a preprocess image;

FIGS. 18A and 18B are schematic views showing a first example in which an image distortion caused by a lens is corrected;

FIGS. 20A and 20B are schematic views showing an example in which an image whose scaling factor varies with the positions therein is corrected;

FIGS. 22A and 22B are schematic views showing an example in which a taken image with a blur is corrected.

DETAILED DESCRIPTION OF THE PREFERRED EMBODIMENTS

Some preferred embodiments of the present disclosure will now be described. The description will be given under the following headings:
1. Structure of the image processing apparatus;
2. Operations of the image processing apparatus;
3. Operations for estimating the code amount in preprocessing;

4. Operations for obtaining DC components in preprocessing; and
5. Specific examples of preprocess images used in preprocessing.

<1. Structure of the Image Processing Apparatus>

Figure 2:
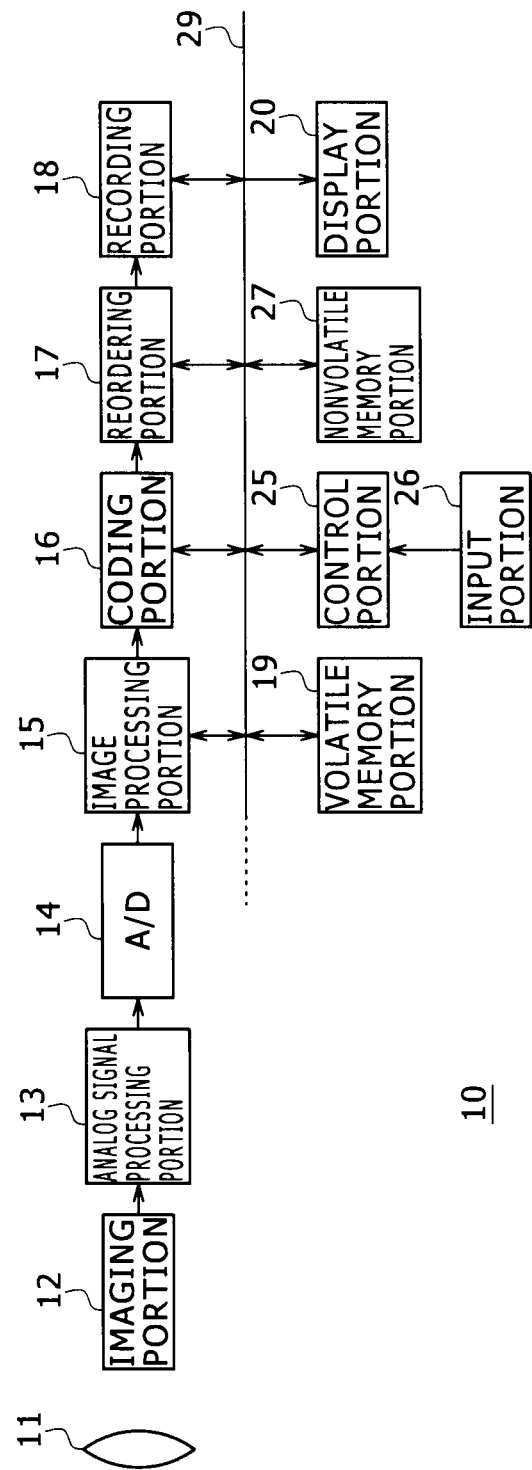
FIG. 2 is a schematic view showing a typical configuration in which an image processing apparatus is applied to an imaging apparatus.

FIG. 2 is a schematic view showing a typical configuration in which an image processing apparatus of the present disclosure is applied to an imaging apparatus 10. The imaging apparatus 10 includes an imaging optics system 11, an imaging portion 12, an analog signal processing portion 13, an analog/digital (A/D) conversion portion 14, an image processing portion 15, a coding portion 16, a reordering portion 17, a recording portion 18, a volatile memory portion 19, a display portion 20, a control portion 25, an input portion 26, and a nonvolatile memory portion 27. In the imaging apparatus 10, the image processing portion 15, coding portion 16, reordering portion 17, recording portion 18, volatile memory portion 19, display portion 20, control portion 25, and nonvolatile memory portion 27 are interconnected via a bus 29.

The imaging optics system 11 is primarily made up of lenses and forms an optical image of an object, not shown, on a light-receiving plane of the imaging portion 12. The imaging portion 12 is structured using a solid-state image sensing device such as a complementary metal-oxide semiconductor (CMOS) or charge coupled device (CCD). The imaging portion 12 performs photoelectric conversion, generating an image signal of the taken image which is formed on the light-receiving plane thereof by the imaging optics system 11 and which represents the optical image. The imaging portion 12 outputs the image signal thus generated to the analog signal processing portion 13. The analog signal processing portion 13 performs such processes as correlated double sampling (CDS) and analog amplification on the analog image signal output from the imaging portion 12, and outputs the processed image signal to the A/D conversion portion 14. The A/D conversion portion 14 converts the analog image signal output from the analog signal processing portion 13 to a digital signal, and outputs image data representative of the image signal following the conversion to the image processing portion 15.

The image processing portion 15 performs a camera signal process and diverse correction processes on the image data output from the A/D conversion portion 14. FIGS. 3A through 3C show typical internal structures of the image processing portion 15. The image processing portion 15 includes blocks for processing the camera signal, such as a white balance adjustment portion 151, a color conversion portion 152, a pseudo color suppression portion 153, and a gamma correction portion 154. Also, the image processing portion 15 includes a chromatic aberration correction portion 155, a distortion correction portion 156, and a blur correction portion 157, for example, as blocks for performing processes whereby the size of an unprocessed image necessary for obtaining a processed image is varied depending on the image positions in a taken image.

The white balance adjustment portion 151 adjusts image data such as signal levels of the three primary colors, in order to reproduce the taken image in optimal colors. Using a known transform matrix, the color conversion portion 152 converts the three-primary-color data following white balance adjustment into brightness data and color difference data. The pseudo color suppression portion 153 performs the process of suppressing pseudo color data at a saturated portion on the color difference data. The gamma correction portion 154 corrects the image data in such a manner as to comply with the gamma characteristics of a display device in use.

The chromatic aberration correction portion 155 performs the process of bringing to the same size images having scaling factors varying with color components. For example, the chromatic aberration correction portion 155 may calculate the amount of chromatic aberration from the imaging optics system 11 and perform chromatic aberration correction on the image data in a manner correcting the calculated amount of chromatic aberration. The distortion correction portion 156 performs the process of bringing to the same size images having scaling factors varying with image positions or the process of correcting an image distortion caused by a lens. For example, the distortion correction portion 156 may perform a distortion correction process on the image data in a manner correcting the distorted image caused by a lens distortion in the imaging optics system 11. The blur correction portion 157 may typically be composed of a filter for performing gain adjustment in such a manner that the corrected image will have a desired frequency characteristic with regard to, say, a PSF (Point Spread Function) frequency characteristic generating a blurred image. The blur correction portion 157 removes the blur by performing a filtering process in which the number of taps in the filter is varied depending on the image position (i.e., where the blur is found).

The order in which image data is processed is not limited to that shown in FIG. 3A. The order may also be one of those shown in FIGS. 3B and 3C. In addition to the components indicated in FIGS. 3A through 3C, the image processing portion 15 may include new blocks for performing signal processing and correction. As another alternative, some of the blocks for carrying out signal processing and correction as shown in FIGS. 3A through 3C may be removed from the structure of the image processing portion 15.

The coding portion 16 in FIG. 2 codes the image data output from the image processing portion 15 to generate coded data. The reordering portion 17 reorders the coded data in block units generated by the coding portion 16 into a predetermined block order. The recording portion 18 records to a recording medium the coded data in block units reordered by the reordering portion 17.

The volatile memory portion 19 is used as a working memory portion. For example, the volatile memory portion 19 may temporarily store the image data of a taken image.

The display portion 20 is composed of liquid crystal display elements, organic electroluminescent display elements or the like. The display portion 20 displays taken images, camera-through images, and menus and other indications regarding the settings and operations of the imaging apparatus.

The input portion 26 is connected to the control portion 25. In order to accept a user's input operations, the input portion 26 includes diverse operation keys such as the power switch, shutter key and zoom key, as well as operation keys for displaying menus, selecting menu items and making various settings. The input portion 26 outputs operation signals reflecting the user's operations to the control portion 25.

The control portion 25 is composed of a microcomputer or the like. The control portion 25 reads and executes programs stored in the nonvolatile memory portion 27 so as to control the components of the imaging apparatus 10 in a manner reflecting the user's operations.

The control portion 25 also acts as a preprocessing instruction portion. Before coding, the control portion 25 instructs the image processing portion 15 to perform image processing on a preprocess image which is part of the input image and sends the processed preprocess image to the coding portion 16 to acquire necessary information for coding the input image beforehand. Furthermore, the control portion 25 determines the preprocess image in such a manner as to reduce the size of the unprocessed image necessary for the image processing portion to provide the processed preprocess image that may take the size of a coding unit, for example, to the coding portion 16.

<2. Operations of the Image Processing Apparatus>

The imaging apparatus 10 performs preprocessing such as estimation of a code amount and acquisition of DC components. In order to code the image data using the result of preprocessing, the imaging apparatus 10 temporarily stores the image data yet to be coded into the volatile memory portion 19 and utilizes the image data held in the volatile memory portion 19 for preprocessing purposes.

If any of the processes performed by the image processing portion 15 is time-consuming, the interval between taking images cannot be shortened. To shorten the image-taking interval, the imaging apparatus 10 may store the image data partially processed by the image processing portion 15 into the volatile memory portion 19 and then read the image data therefrom so that the image processing portion 15 may carry out the remaining processes.

Furthermore, if the image data processed by the image processing portion 15 is temporarily stored in the volatile memory portion 19 so that the image data held therein may be used for preprocessing or for coding the entire taken image, the traffic to the volatile memory portion 19 will increase. Thus when performing preprocessing or coding the entire taken image, the imaging apparatus 10 may supply the coding portion 16 with the image data processed by the image processing portion 15 without getting the image data stored temporarily in the volatile memory portion 19.

Figure 4:
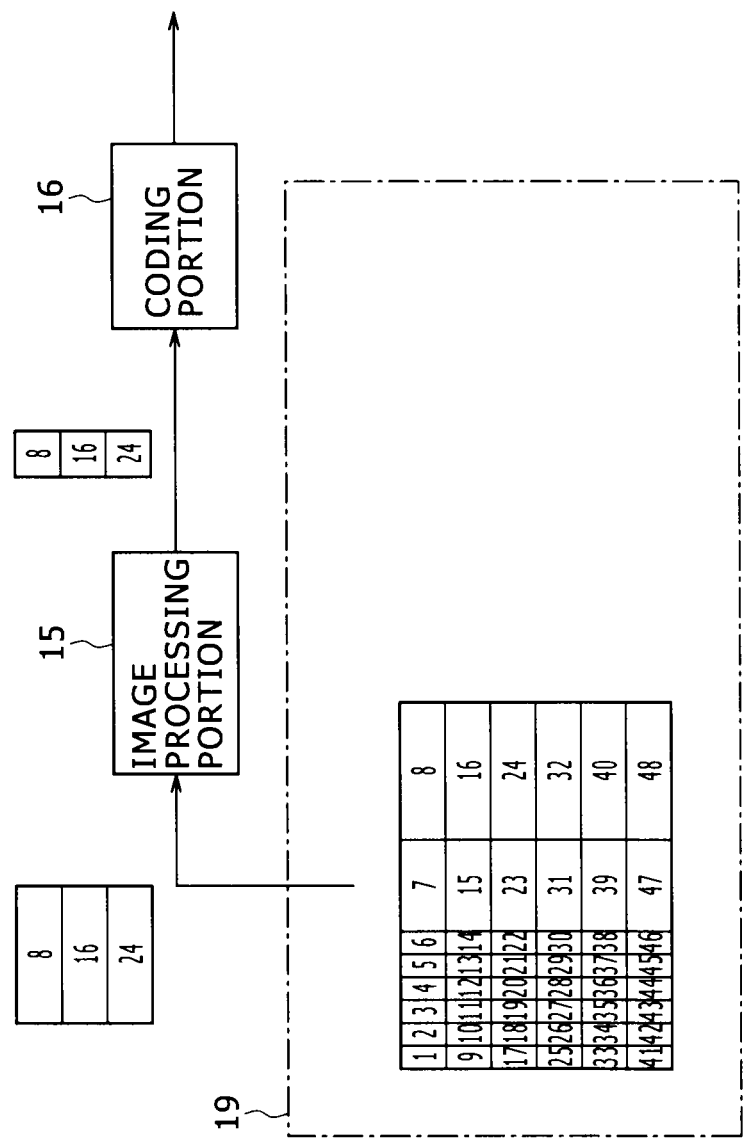
FIG. 4 is a schematic view showing an example in which preprocessing is performed using image data stored in a volatile memory portion.

FIG. 4 shows an example in which preprocessing is performed using the image data yet to be corrected for distortion and stored temporarily in the volatile memory portion 19. In this example, the image data uncorrected for distortion shows that the left side of the image is not distorted while the right side thereof has a large distortion.

Figure 5:
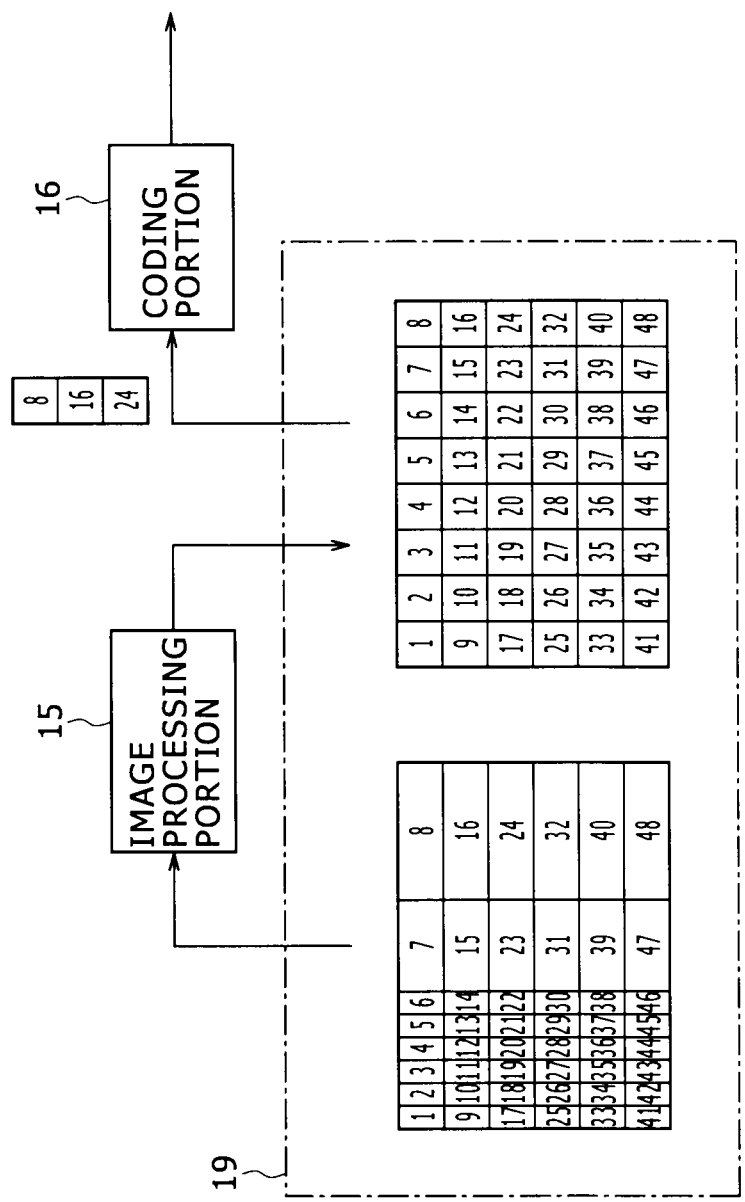
FIG. 5 is a schematic view showing an example in which image data following image processing is stored temporarily in the volatile memory portion before being coded.

For example, if preprocess images are positioned in blocks "8," "16" and "24," the imaging apparatus 10 reads the image data of blocks "8," "16" and "24" from the volatile memory portion 19 and causes the image processing portion 15 to correct the read image data for distortion and to feed the corrected image data to the coding portion 16.

Where the imaging apparatus 10 supplies the image data corrected for distortion to the coding portion 16 as described, the traffic to the volatile memory portion 19 is made lighter than if the image data following image processing is temporarily stored into the volatile memory portion 19, as shown in FIG. 5.

Figure 6:
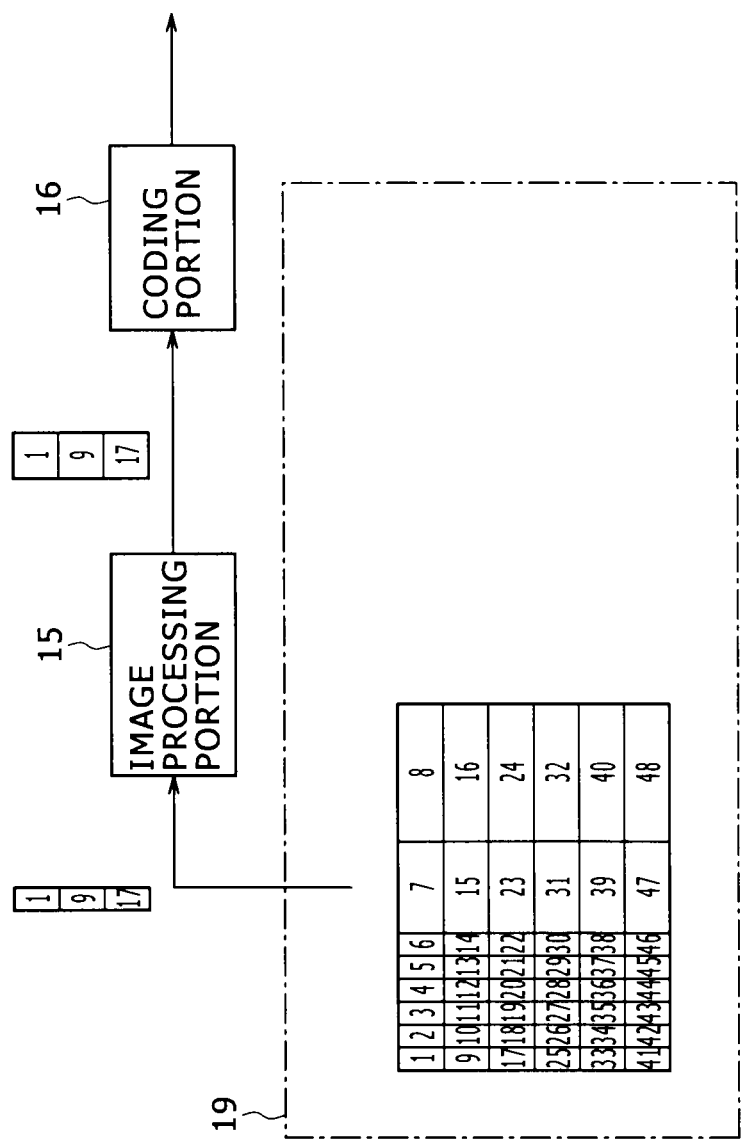
FIG. 6 is a schematic view showing an example in which image data is read from an area having a small image distortion.

In preprocessing, if image data is read from the blocks yet to be corrected for distortion and if the preprocess images are positioned in areas where the image is largely distorted as shown in FIG. 4, the amount of the data to be read turns out to be larger than if the preprocess images are positioned in areas where the image is negligibly distorted as shown in FIG. 6.

Thus the imaging apparatus 10 determines the preprocess image in such a manner as to reduce the size of the unprocessed image necessary for the image processing portion 15 to feed the processed preprocess image to the coding portion 16. That is, the imaging apparatus 10 selects as the area for the preprocess image the position in the screen where the amount of read image data necessary for obtaining the preprocess image is small, and regards the area for the unprocessed image necessary for obtaining the preprocess image as a preprocess read area. Also, the imaging apparatus 10 reads image data from the preprocess read area, corrects the read image data for distortion, and obtains in advance information necessary for coding the input image using the image data corrected for distortion. Furthermore, the imaging apparatus 10 codes the input image using the result obtained in advance from preprocessing.

<3. Operations for Estimating the Code Amount in Preprocessing>

Explained below are typical operations for estimating the code amount in preprocessing. It is assumed that the image data used in preprocessing is the image data yet to be corrected for distortion and stored in the volatile memory portion 19.

Figure 7:
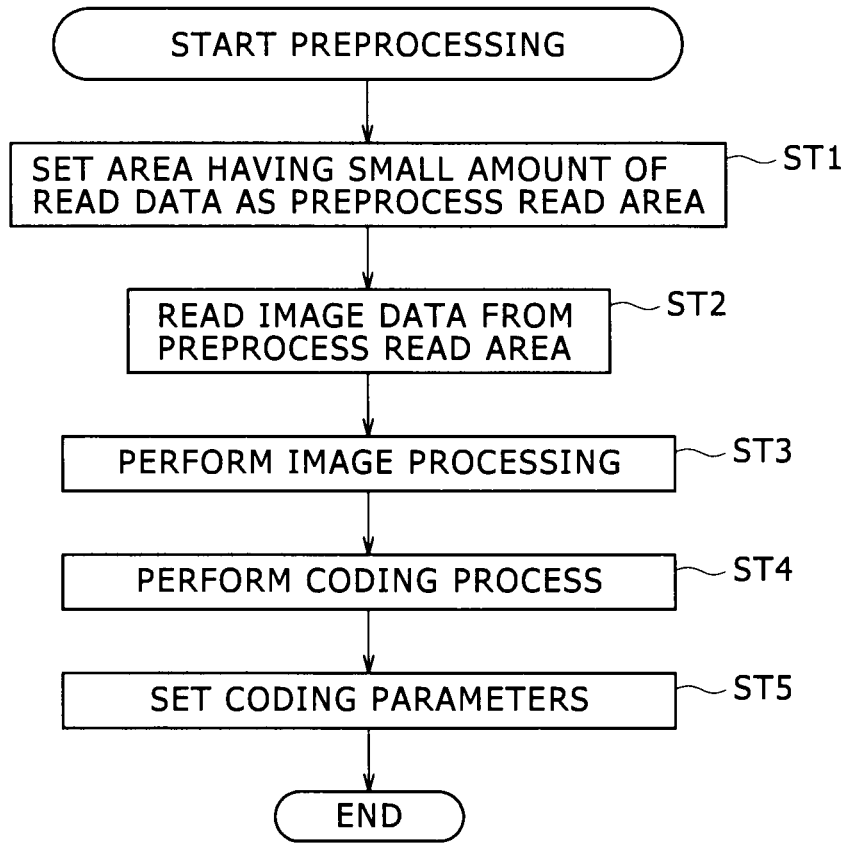
FIG. 7 is a flowchart showing a code amount estimation process.

FIG. 7 is a flowchart showing a code amount estimation process. In step ST1, the control portion 25 sets a code amount estimation area. For example, where a distorted image stemming from a lens distortion is to be corrected, the nature of the generated distortion can be determined based on the lens used, zoom factor, etc. Thus the control portion 25 determines the image area of which the distortion is small in accordance with the lens used, zoom factor, etc. Also, the control portion 25 determines the preprocess image in such a manner as to reduce the size of the unprocessed image necessary for obtaining the processed preprocess image in preprocessing.

Furthermore, the control portion 25 sets as the code amount estimation area the area for the unprocessed image necessary for obtaining the determined preprocess image. Thereafter the control portion 25 goes to step ST2.

For code amount estimation, there may be provided, for example, preprocess images of the same size arrayed at equal intervals with respect to the processed image. The code amount of the taken image may then be estimated using the code amount derived from the preprocess images being coded. FIG. 8A shows an example in which the right side of the taken image has a large distortion and the left side thereof has a small distortion. FIG. 8B shows that the columns of blocks "2," "4," "6" and "8" are taken as preprocess images and that areas GAp2, GAp4, GAp6 and GAp8 are set as code amount estimation areas. The example of FIG. 8B involves a larger amount of data to be read than if the columns of blocks "1," "3," "5" and "7" are taken as preprocess images with areas GAp1, GAp3, GAp5 and GAp7 set as the code amount estimation areas, as shown in FIG. 8C. Thus the control portion 25 determines the preprocess images in the image parts having small distortions. That is, the control portion 25 selects the images in the columns of blocks "1," "3," "5" and "7" as the preprocess images and sets the areas GAp1, GAp3, GAp5 and GAp7 as the code amount estimation areas (i.e., preprocess read areas).

Figures 9A, 9B, 9C:
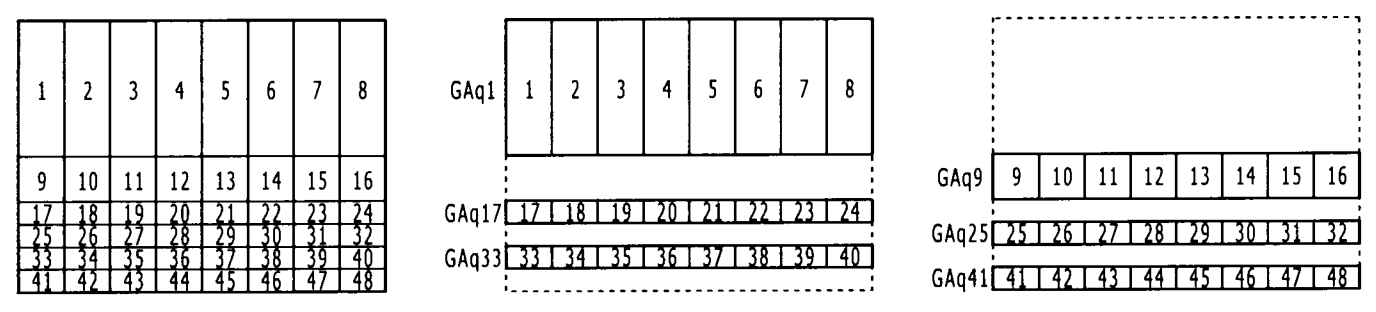

Suppose that the upper part of the taken image has a large distortion and the lower part thereof has a small distortion, as shown in FIG. 9A. In this case, if the rows of blocks "1," "17" and "33" are taken as code amount estimation areas GAq1, GAq17 and GAq33 as shown in FIG. 9B, this will result in a larger amount of data to be read out. Thus the control portion 25 sets the code amount estimation areas in the image parts having small distortions. That is, as shown in FIG. 9C, the control portion 25 sets the columns of blocks "9," "25" and "41" as the code amount estimation areas GAq9, GAq25 and GAq41.

In step ST2, the control portion 25 reads the image data of the code amount estimation areas from the volatile memory portion 19 and feeds the read image data to the image processing portion 15. After step ST2, the control portion 25 goes to step ST3.

In step ST3, the image processing portion 15 carries out image processing. The image processing portion 15 may perform distortion correction and other processes on the read image data of the code amount estimation areas. Also, the image processing portion 15 outputs the processed image data to the coding portion 16, before going to step ST4.

In step ST4, the coding portion 16 performs coding.

The coding portion 16 codes the processed image data supplied from the image processing portion 15 to generate coded data. Following generation of the coded data, step ST5 is reached.

In step ST5, the control portion 25 determines coding parameters. The control portion 25 estimates the code amount of the taken image being coded based on the code amount given when the coding portion 16 coded the image data of the preprocess images, i.e., image data of the code amount estimation areas. Also, based on the result of the code amount estimation, the control portion 25 determines the coding parameters in such a manner that the code amount of the taken image being coded will reach a desired amount. For example, if the taken image is to be coded using the JPEG (Joint Photographic Experts Group) method, quantization step size and other parameters are determined so that the code amount of the taken image being coded will coincide with the desired amount.

Figure 10:
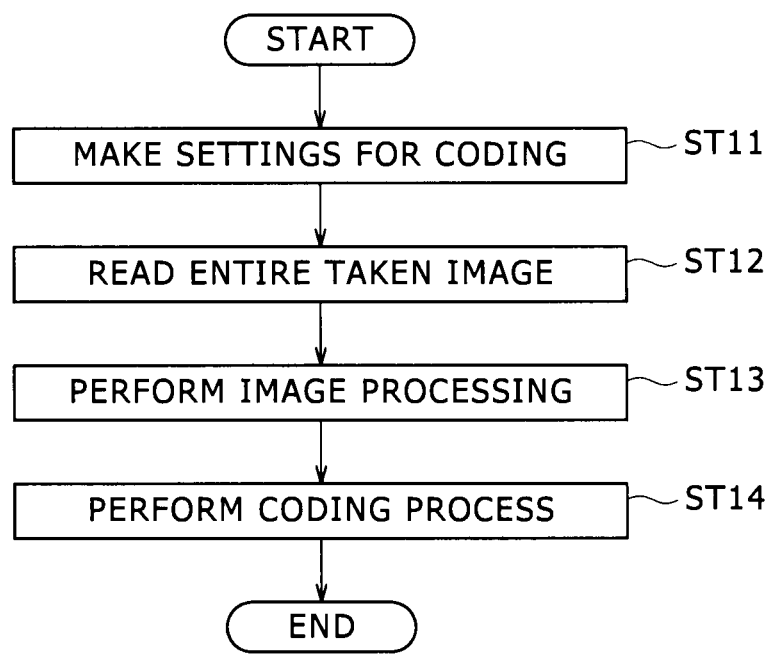
FIG. 10 is a flowchart showing how a taken image is typically coded.

Furthermore, the imaging apparatus 10 codes the taken image using the coding parameters determined through the preprocessing. FIG. 10 is a flowchart showing how the taken image is typically coded. In step ST11, the control portion 25 makes the settings for coding. The control portion 25 supplies the coding portion 16 with the coding parameters determined during the preprocessing shown in FIG. 7, makes the settings for coding by the coding portion 16, and goes to step ST12.

In step ST12, the control portion 25 reads the entire taken image. The control portion 25 reads successively the image data of the entire taken image stored in the volatile memory portion 19, supplies the image processing portion 15 with the image data thus retrieved, and goes to step ST13.

In step ST13, the image processing portion 15 performs image processing. The image processing portion 15 performs distortion correction and other processes on the image data of the taken image stored in the volatile memory portion 19, outputs the processed image data to the coding portion 16, and goes to step ST14.

In step ST14, the coding portion 16 performs coding. The coding portion 16 codes the processed image data fed from the image processing portion 15. This makes it possible to obtain the desired amount of the coded data of the taken image.

As described above, the preprocess image is determined in such a manner as to reduce the size of the unprocessed image necessary for obtaining the processed preprocess image. The preprocess image thus acquired is used to estimate the code amount. As a result, when preprocessing is performed, it is possible to lower the amount of the image data read from the volatile memory portion 19 so that processing time and power consumption may be reduced. Furthermore, since the image data processed by the image processing portion 15 is supplied to the coding portion 16, the traffic to the volatile memory portion 19 can be reduced.

<4. Operations for Obtaining DC components in preprocessing>

What follows is an explanation of how the coding portion 16 operates to code image data using the JPEG method and to acquire DC components in preprocessing. The coding method involves coding a previous value difference that is the difference in DC component from the immediately preceding coded block, in order to enhance coding efficiency. To carry out image processing and other processes efficiently, the imaging apparatus 10 may read image data in increments of a plurality of blocks as a unit of image processing. In this case, the DC component as the previous value for calculating the previous value difference may be obtained beforehand in preprocessing. When image data is read in increments of such an image processing unit, the DC component acquired beforehand in preprocessing may be used to code the read blocks.

Figure 11:
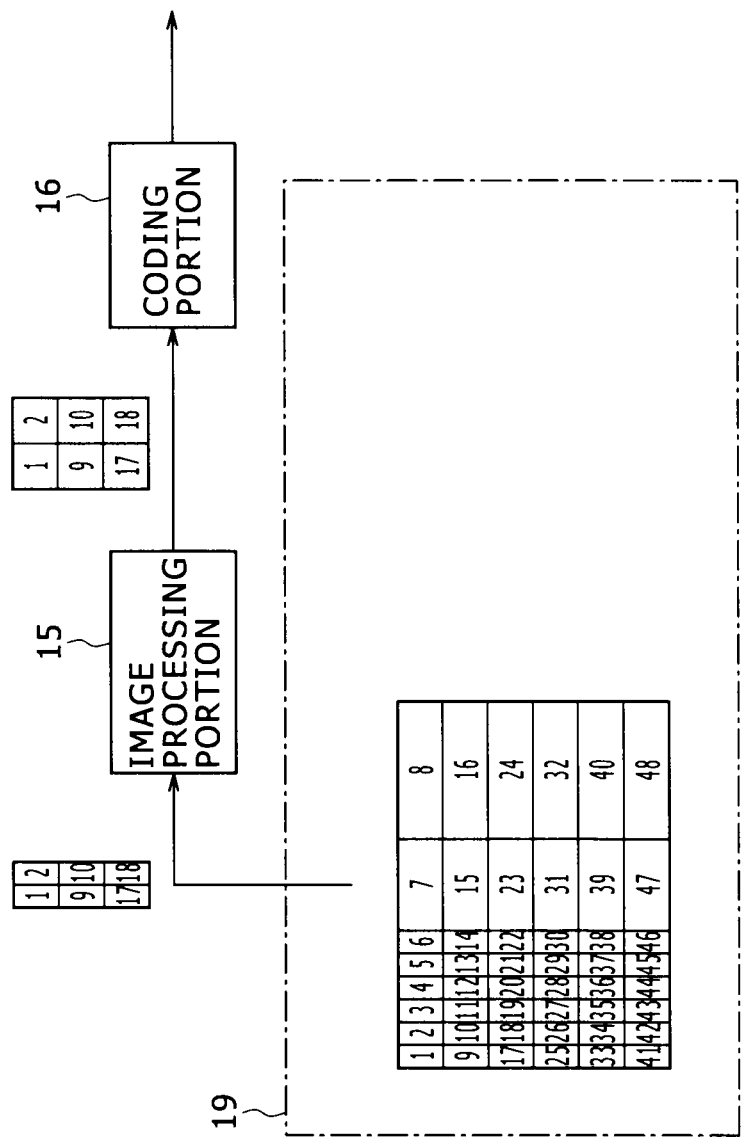
FIG. 11 is a schematic view showing an example in which the unit of image processing is two blocks in the horizontal direction and three blocks in the vertical direction.

For example, if the image processing unit is two blocks in the horizontal direction and three blocks in the vertical direction as shown in FIG. 11, the imaging apparatus 10 may read the image data of blocks "1," "2," "9," "10," "17" and "18" from the volatile memory portion 19 for image processing and coding. In this case, if the DC components of the blocks "8" and "16" are obtained in preprocessing, then blocks "9" and "17" can be coded thereby. Block "1" is the first block and the calculated DC component is quantized. Block "2" is coded using the DC component of block "1." Likewise, blocks "10" and "18" are coded using the DC components of blocks "9" and "17," respectively.

The imaging apparatus 10 acquires DC components beforehand in preprocessing as described above. If image data is read in increments of the image processing unit, the imaging apparatus 10 can code the image data thus read using the DC components obtained in the preprocessing.

Figure 12:
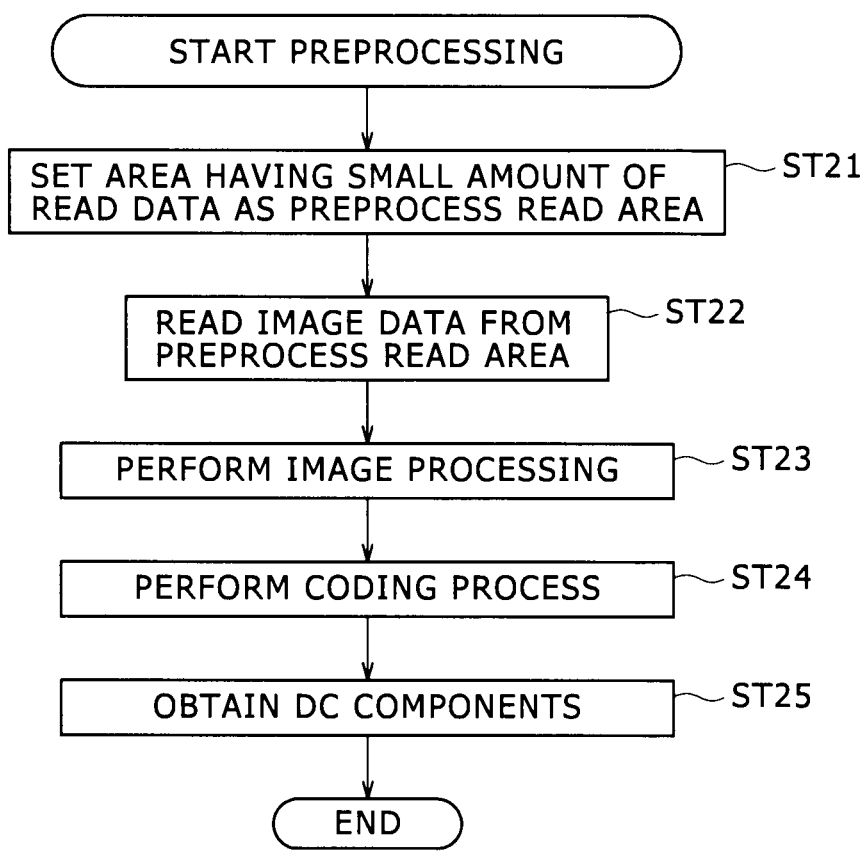
FIG. 12 is a flowchart showing a DC component acquisition process.

FIG. 12 is a flowchart showing a DC component acquisition process. In step ST21, the control portion 25 sets a preprocess read area. For example, where a distorted image stemming from a lens distortion is to be corrected, the nature of the generated distortion can be determined based on the lens used, zoom factor, etc. Thus the control portion 25 determines the image area of which the distortion is small in accordance with the lens used, zoom factor, etc. Also, the control portion 25 determines the preprocess image based on the result of the determination of the image area in such a manner as to reduce the size of the unprocessed image necessary for obtaining the processed preprocess image in preprocessing. Furthermore, the control portion 25 sets as the preprocess read area the area for the unprocessed image necessary for obtaining the determined preprocess image. The control portion 25 then goes to step ST22.

Suppose now that the right side of a taken image has a large distortion and the left side thereof has a small distortion as shown in FIG. 13A. In this case, if the image of the column of block "8" in the largely distorted image part is taken as a preprocess image so that an area GAp8 is regarded as a preprocess read area as shown in FIG. 13B, the amount of the data to be read will be raised. Thus the control portion 25 positions the preprocess image in an image part with a small distortion and sets the preprocess read area accordingly. For example, as shown in FIG. 13C, the image of the column of block "2" in an image part with a small distortion may be taken as the preprocess image and an area GAp2 is regarded as the preprocess read area.

In step ST22, the control portion 25 reads the image data of the preprocess read area from the volatile memory portion 19 and feeds the read image data to the image processing portion 15, before going to step ST23.

In step ST23, the image processing portion 15 performs image processing. The image processing portion 15 may perform distortion correction and other processes on the retrieved image data of the preprocess read area. The image processing portion 15 then outputs the processed image data to the coding portion 16, and goes to step ST24.

In step ST24, the coding portion 16 performs coding. The coding portion 16 codes the processed image data fed from the image processing portion 15, and goes to step ST25.

In step ST25, the control portion 25 acquires DC components. The control portion 25 terminates the preprocessing upon storing the DC components obtained by the coding portion 16 having coded the image data of the preprocess read area, the storing being done in a manner allowing the DC components to be used in the subsequent coding of the entire taken image.

Figure 14:
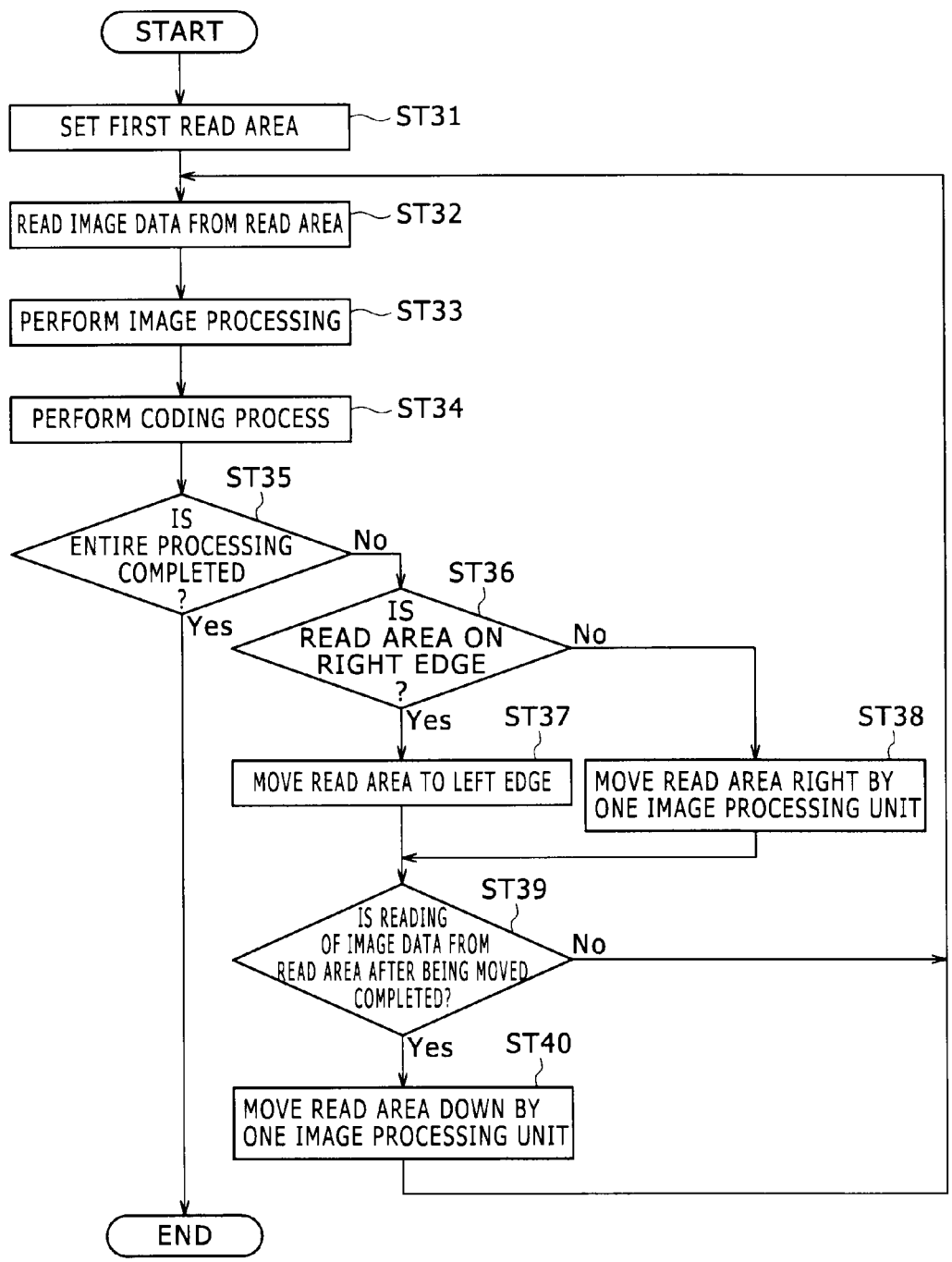
FIG. 14 is a flowchart showing how a taken image is typically coded.

Furthermore, the imaging apparatus 10 codes the taken image using the DC components acquired in the preprocessing. FIG. 14 is a flowchart showing how the taken image is typically coded. In step ST31, the control portion 25 sets a first read area. The control portion 25 sets as the first read area an area composed of the image processing units adjacent in the forward direction of coding to the blocks read in preprocessing, and goes to step ST32.

In step ST32, the control portion 25 reads the image data of the read area. The control portion 25 reads the image data of the read area from the volatile memory portion 19 and supplies the retrieved image data to the image processing portion 15, before going to step ST33.

In step ST33, the image processing portion 15 performs image processing using the retrieved image data. The image processing portion 15 performs distortion correction and other processes using the image data retrieved in increments of an image processing unit, before going to step ST34.

In step ST34, the coding portion 16 performs coding. The coding portion 16 codes the image data using the DC components obtained in preprocessing or during the preceding coding process, before going to step ST35.

In step ST35, the control portion 25 determines whether the entire processing is completed. If there remains any image data yet to be processed and coded, the control portion 25 goes to step ST36. If the entire taken image has been processed and coded, the control portion 25 terminates the processing.

In step ST36, the control portion 25 determines whether the read area is on the right edge. If the read area is positioned on the right edge of the taken image, the control portion 25 goes to step ST37. Otherwise the control portion 25 goes to step ST38.

In step ST37, the control portion 25 moves the read area to the left edge. The control portion 25 then goes to step ST39.

In step ST38, the control portion 25 moves the read area right by one image processing unit. After step ST38, the control portion 25 goes to step ST39.

In step ST39, the control portion 25 determines whether reading of the image data from the read area after being moved is completed. If it is determined that reading of the image data from the moved read area is completed, the control portion 25 goes to step ST40. If it is determined that the image data has yet to be read from the moved read area, the control portion 25 returns to step ST32.

In step ST40, the control portion 25 moves the read area down by one image processing unit. After step ST40, the control portion 25 returns to step ST32.

Figure 15:
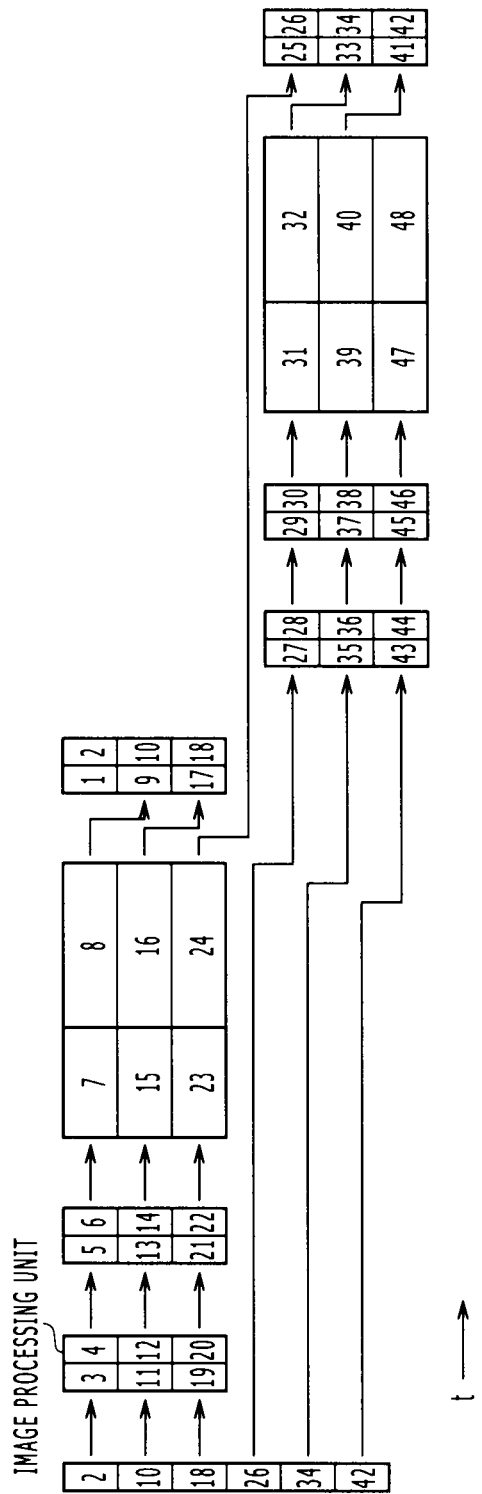
FIG. 15 is a schematic view showing a coding operation using a block "2" column as a preprocess image.

FIG. 15 shows a coding operation performed when the preprocess read area is set taking the image of the column of block "2" as a preprocess image.

When the image of the column of block "2" is taken as the preprocess image, the control portion 25 sets as the first read area an area composed of the image processing units adjacent in the forward direction of coding to the blocks read in preprocessing, i.e., an area made of blocks "3," "4," "11," "12," "19" and "20." The control portion 25 then reads the image data of the read area, and processes and codes the read data. Since the DC components of blocks "2," "10" and "18" have been obtained in preprocessing, the coding portion 16 codes blocks "3," "11" and "19" using the acquired DC components. Also, the coding portion 16 can code blocks "4," "12" and "20" using the DC components calculated during coding of blocks "3," "11" and "19."

Upon completion of the image processing and coding of the first read area, the control portion 25 moves the read area to an area composed of blocks "5," "6," "13," "14," "21" and "22," and performs image processing and coding using the image data of the newly reached read area. Where blocks "5," "13" and "21" are to be coded, the DC components calculated during coding of blocks "4," "12" and "20" are used.

The control portion 25 then moves the read area to an area composed of blocks "7," "8," "15," "16," "23" and "24," and performs image processing and coding using the image data of the newly reached read area. At this point, the read area is positioned on the right edge of the image. Thus after image processing and coding of this read area, the control portion 25 moves the read area to the left edge of the image, i.e., to an area composed of blocks "1," "2," "9," "10," "17" and "18."

The control portion 25 then performs image processing and coding using the image data of the newly reached read area. Block "1" is the first block and the calculated DC component is quantized. Blocks "9" and "17" are coded using the DC components calculated during coding of blocks "8" and "16," respectively.

The read area is then moved to the right. The read area this time is composed of blocks "3," "4," "11," "12," "19" and "20" of which the image processing and coding have already been carried out. Thus the control portion 25 moves the read area down to reach an area composed of blocks "27," "28," "35," "36," "43" and "44," and performs image processing and coding using the newly reached read area. Since the DC components of blocks "26," "34" and "42" have been obtained in preprocessing, the coding portion 16 can code blocks "27," "35" and "43" using these DC components. Image processing and coding can then be carried out likewise on the entire taken image.

As described above, the control portion 25 determines the preprocess image in such a manner as to reduce the size of the unprocessed image necessary for obtaining the processed preprocess image. Using the preprocess image thus determined, the control portion 25 obtains beforehand the previous value for calculating the previous value difference. This allows the imaging apparatus 10 to minimize the amount of the image data to be read from the volatile memory portion 19 upon preprocessing, thereby reducing processing time and power consumption. Furthermore, because the image data processed by the image processing portion 15 is supplied to the coding portion 16, the imaging apparatus 10 can lower the traffic to the volatile memory portion 19.

Incidentally, if the preprocess read area is set in a manner that reduces the amount of read data and if the area composed of the image processing units adjacent in the forward direction of coding to the blocks read in preprocessing is set as the first read area, the eventually coded data may not be ordered in a manner conforming to the coding method in use.

Figures 16A, 16B, 16C, 16D, 16E:
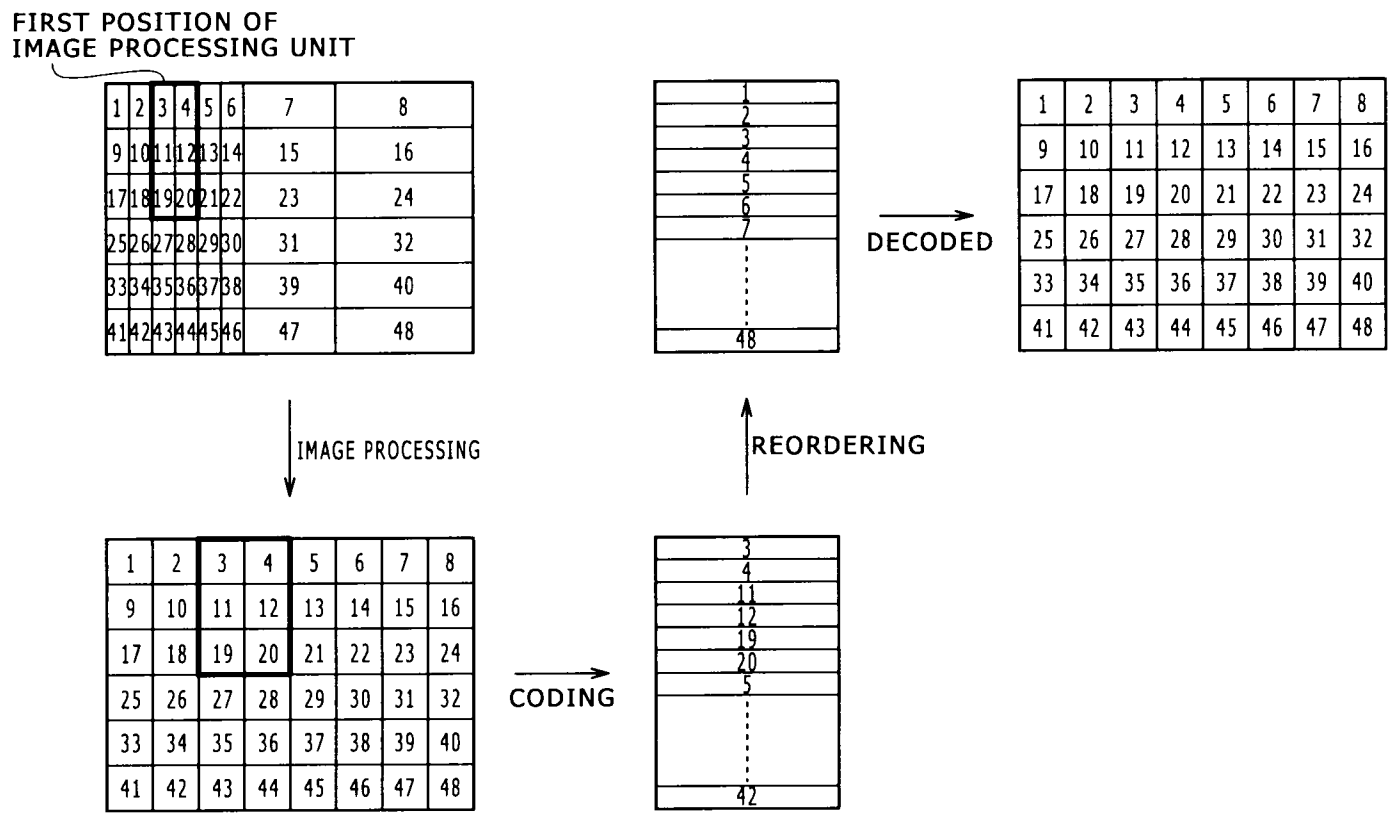

FIGS. 16A, 16B, 16C, 16D and 16E show image processing and a coding operation performed when the image of the column of block "2" is taken as a preprocess image. For example, using the image of the column of block "2" as the preprocess image, the control portion 25 may set as the first read area an area composed of blocks "3," "4," "11," "12," "19" and "20," as shown in FIG. 16A. When image processing is started from the first read area, the processed image data is generated from the first read area as shown in FIG. 16B. Because the processed image data is supplied to the coding portion 16, coded data is generated in the order of the blocks shown in FIG. 16C. Because blocks of the coded data thus generated are not correctly ordered as per the coding method, the reordering portion 17 reorders the coded data in increments of a block.

Figures 17A, 17B:
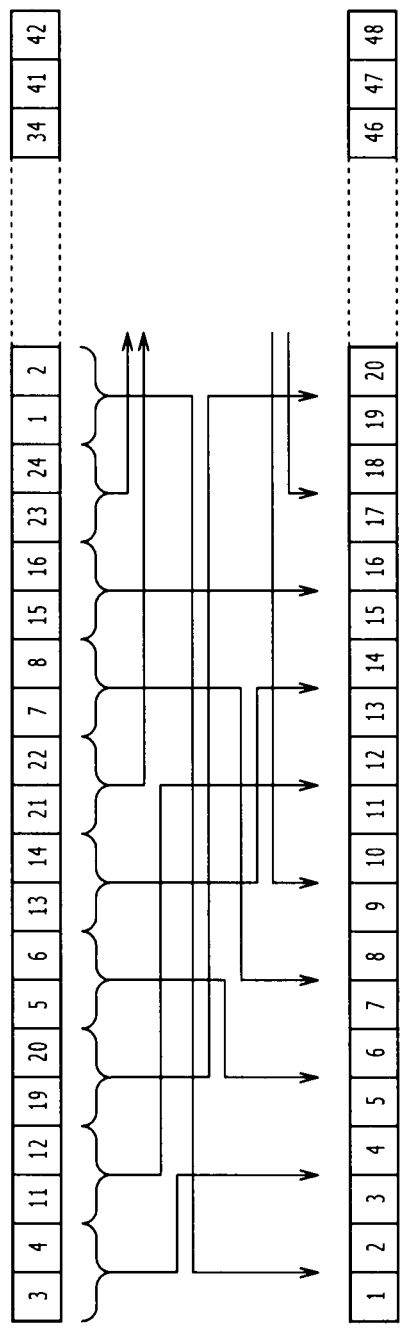
FIGS. 17A and 17B are schematic views showing how block units of coded data are reordered.
Figure 19A:
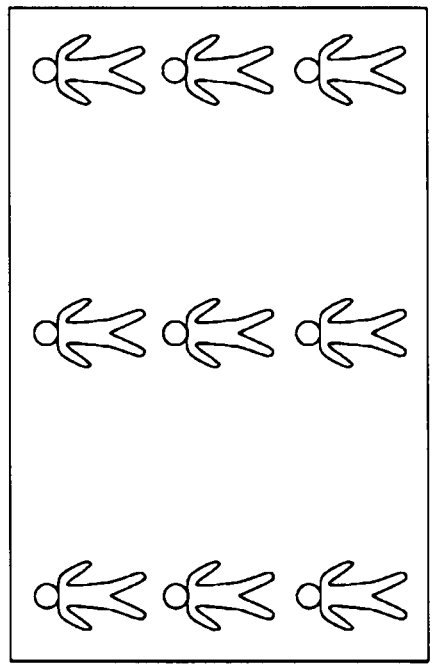
FIGS. 19A and 19B are schematic views showing a second example in which an image distortion caused by a lens is corrected.
Figure 19B:
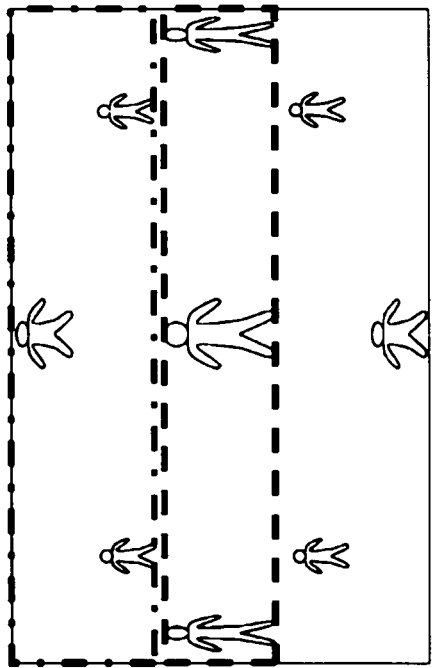

FIGS. 17A and 17B are schematic views showing how block units of coded data are reordered. FIG. 17A shows a typical order of blocks in effect when processed image data is coded. The reordering portion 17 reorders the coded data in increments of a block so that the blocks are ordered correctly as per the coding method, that is, rearranged rightward in ascending order of block numbers starting from "1," as shown in FIG. 17B.

After such reordering, the coded data is rearranged into the order shown in FIG. 16D. When the coded data thus reordered is decoded, the image data can be generated in the correct order of blocks as shown in FIG. 16E.

<5. Specific Examples of Preprocess Images Used in Preprocessing>

FIGS. 18A through 19B show an example in which an image distortion caused by a lens is corrected. FIGS. 18A and 19A each indicate an uncorrected image, and FIGS. 18B and 19B each show a corrected image. Image distortions attributable to the lens tend to appear not at the center but on the edges. As shown in FIGS. 18A through 19B, the control portion 25 thus sets the preprocess read area by determining the preprocess image at the center as indicated by broken lines. This setting makes the amount of the image data to be read in preprocessing smaller than that if the preprocess image is determined on the edge as indicated by dashed lines. This allows the imaging apparatus 10 to reduce processing time and power consumption.

FIGS. 20A and 20B show an example in which an image whose scaling factor varies with the positions therein is corrected. FIG. 20A shows an uncorrected image, and FIG. 20B indicates a corrected image. When the scaling factor varies with the positions in the image, the control portion 25 determines the preprocess image in the position where the scale-down factor is large (i.e., on the left side of the figure) in order to set the preprocess read area. The setting makes the amount of the image data to be read in preprocessing smaller than that if the preprocess image is positioned at the center or on the right. This allows the imaging apparatus 10 to reduce processing time and power consumption.

Figure 21A:
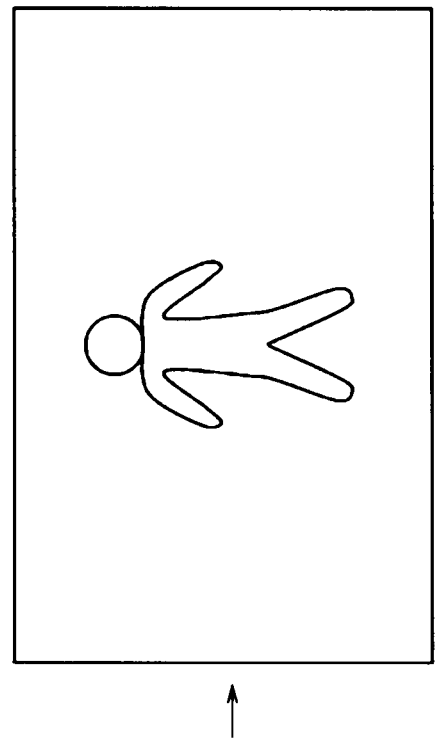
FIGS. 21A and 21B are schematic views showing an example in which images whose scaling factors vary with the colors therein are corrected.
Figure 21B:
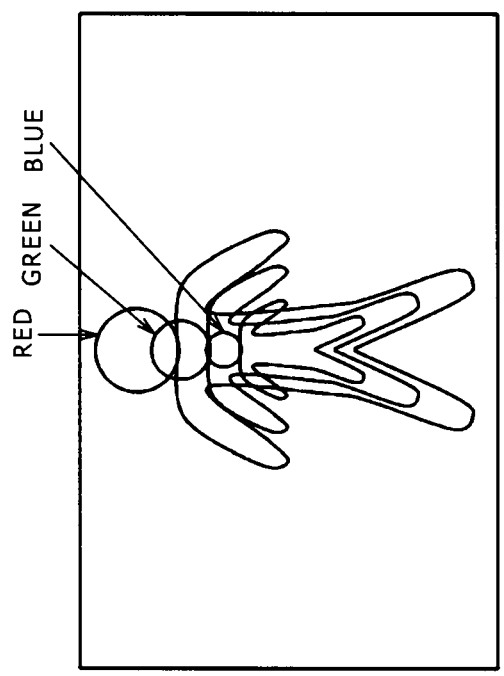

FIGS. 21A and 21B show an example in which images whose scaling factors vary with the colors therein are corrected. FIG. 21A shows uncorrected images and FIG. 21B indicates a corrected image. The example shows that the scale-down factor of a blue image is large and so is the scale-up factor of a red image. Where the effects of chromatic aberration are corrected by the image processing portion 15, the images are larger in scaling factor the closer to the edges of the screen and are smaller the closer to the screen center. Thus the control portion 25 determines the position of the preprocess image at the center in order to set the preprocess read area. The setting makes the amount of the image data to be read in preprocessing smaller than that if the position of the preprocess image is determined on the edge. This allows the imaging apparatus 10 to reduce processing time and power consumption.

FIGS. 22A and 22B show an example in which a taken image with a blur is corrected. In FIG. 22A, the image of a person on the right is blurred. Correction of the blurred image is typically accomplished using a digital filter. In order to carry out the filtering process, it is generally necessary to read the image data of an area wider than that targeted to be corrected. If the number of taps in the digital filter is increased, the area from which to read the image data may be enlarged correspondingly. That is, when blur correction is carried out in image processing, the image data generally needs to be read from an area wider than the blurred area.

Thus the control portion 25 determines the position of the preprocess image where there are few blurs. This makes the amount of the data to be read in preprocessing smaller than that if the position of the preprocess image is determined where there exist many blurs. That in turn allows the imaging apparatus 10 to reduce processing time and power consumption.

Furthermore, when the image processing portion 15 performs distortion correction, chromatic aberration correction and blur correction, the imaging apparatus 10 may take into consideration the amount of the image data necessary for each of these correction processes in such a manner as to optimize the position of the preprocess image.

Figures 23A, 23B, 23C, 23D:
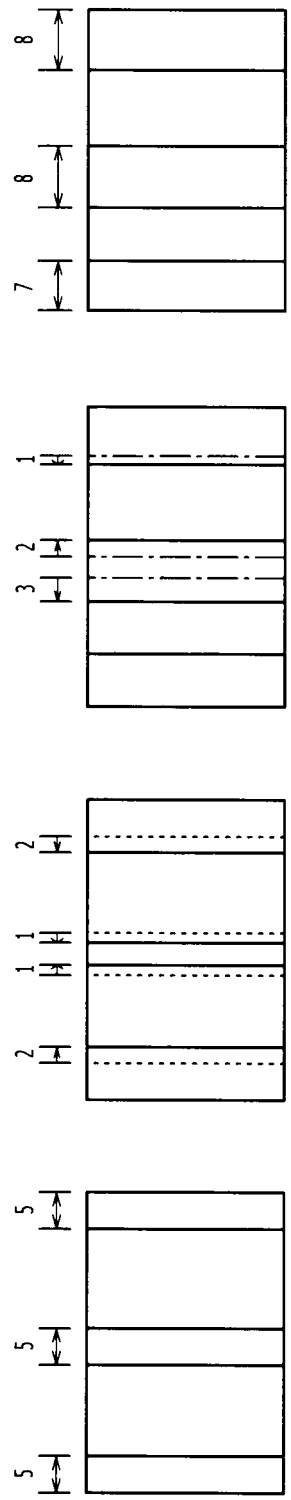
FIGS. 23A, 23B, 23C and 23D are schematic views showing the operations of determining a preprocess image in effect when blur correction and distortion correction are performed successively.

FIGS. 23A, 23B, 23C and 23D show the operations of determining a preprocess image in effect when blur correction and distortion correction are performed successively on the image data read from the volatile memory portion 19. FIG. 23A shows, for example, three candidate areas (each 5 pixels wide) for the preprocess image in the image processed by the image processing portion 15. In FIG. 23A, a leftmost area, a rightmost area, and a center area of the image are selected as the candidate areas for the preprocess image.

FIG. 23B indicates uncorrected preprocess read areas necessary for obtaining the corrected preprocess image. For example, FIG. 23B shows that in order to obtain the preprocess image of the leftmost candidate area following distortion correction and other corrections, it is necessary to acquire from the uncorrected image the image data of an area two pixels wider than the leftmost candidate area (5 pixels wide). That is, if distortion correction is performed using the image data of a preprocess read area having the width of seven pixels on the left edge, the preprocess image of the leftmost candidate area shown in FIG. 23A can be generated.

Likewise, FIG. 23B shows that in order to obtain the preprocess image of the rightmost candidate area, it is necessary to acquire from the uncorrected image the image data of an area two pixels wider than the rightmost candidate area (5 pixels wide). FIG. 23B also shows that in order to obtain the preprocess image of the center candidate area, it is necessary to acquire from the uncorrected image the image data of an area one pixel narrower on both sides than the center candidate area (5 pixels wide).

FIG. 23C shows preprocess read areas yet to be corrected for blur and necessary for obtaining the preprocess images of the candidate areas corrected for blur. In FIG. 23C, it is assumed that the leftmost candidate area is the area of the preprocess image not blurred, that the center candidate area is the area of the preprocess image significantly blurred, and that the rightmost candidate area is the area of the preprocess image negligibly blurred.

The leftmost candidate area without blur in the image has no need for the filtering process for blur correction. Thus FIG. 23C indicates that in order to obtain the preprocess image of a corrected leftmost candidate area, it is necessary to acquire from the uncorrected image the image data of the uncorrected leftmost candidate area (i.e., an area 7 pixels wide). That is, if blur correction is performed using the image data of the leftmost area seven pixels wide, the preprocess image of the leftmost candidate area shown in FIG. 23B can be generated.

FIG. 23C also shows that in order to perform blur correction of the preprocess image of the rightmost candidate area, it is necessary to acquire an area wider than the uncorrected rightmost candidate area by the number of pixels corresponding to the tap count of the filter. For example, it is shown necessary to obtain from the uncorrected image the image data of an area wider than the uncorrected rightmost candidate area by one pixel. Furthermore, FIG. 23C indicates that in order to correct the blurs of the preprocess image of the center candidate area, it is necessary to acquire an area wider than the uncorrected center candidate area by the number of pixels corresponding to the tap count of the filter. For example, to correct the many blurs with an increased tap count, it is shown necessary to acquire from the uncorrected image the image data of an area wider than the uncorrected center candidate area by three pixels on the left and two pixels on the right.

That is, in order to obtain the preprocess images of the candidate areas by reading the image data from the volatile memory portion 19 for blur correction and distortion correction, it is necessary to read the image data of the areas shown in FIG. 23D. For example, to obtain the image of the leftmost candidate area shown in FIG. 23A, it is necessary to set as the preprocess read area a leftmost area seven pixels wide and read the image data from the volatile memory portion 19 accordingly. And in order to obtain the image of the rightmost candidate area shown in FIG. 23A, it is necessary to set as the preprocess read area a rightmost area eight pixels wide and read the image data from the volatile memory portion 19 accordingly. Furthermore, to obtain the image of the center candidate area shown in FIG. 23A, it is necessary to set as the preprocess read area a center area eight pixels wide and read the image data from the volatile memory portion 19 accordingly.

Thus the control portion 25 compares the amounts of the image data to be read from the volatile memory portion 19, and selects as the preprocess image the image of the leftmost candidate area having the smallest amount of data. Also, the control portion 25 sets as the preprocess read area the area of the unprocessed image necessary for obtaining the image of the leftmost candidate area that is the preprocess image. In this manner, when combining a plurality of correction processes to be carried out, the control portion 25 sets the preprocess read area by taking into consideration the areas necessary for the respective correction processes. This allows the imaging apparatus 10 to reduce processing time and power consumption.

The series of the processes explained in this specification may be carried out either by hardware, by software, or by the combination of both. Where image processing and coding are to be performed by software, the programs constituting processing sequences may be either loaded from the dedicated hardware of a computer into its internal memory for execution, or installed at program execution time from a suitable source into a general-purpose computer or like equipment capable of executing diverse functions based on the installed programs.

For example, the programs may be prerecorded on a hard disc or a ROM (read only memory) serving as a recording medium. Alternatively, the programs may be stored (recorded) temporarily or permanently on removable recording media such as flexible discs, CD-ROMs (compact disc-read only memories), MO (magneto-optical) discs, DVDs (digital versatile discs), magnetic discs or semiconductor memories. These removable recording media may be offered as so-called package software.

Besides being installed from the above-mentioned removable recording media into the computer, the programs may be transferred to the computer wirelessly from a download website or in wired fashion via a LAN (local area network) or over the Internet. The computer may receive the programs thus transferred and have them installed onto a suitable built-in recording medium such as a hard disc.

The image processing apparatus, image processing method, and imaging apparatus using the technology disclosed herein perform preprocessing in such a manner that with an input image subjected to image processing and prior to coding of the processed image, a preprocess image which is part of the input image is processed and coded to obtain information necessary for coding the input image beforehand. This preprocessing involves determining the preprocess image in such a manner as to reduce the size of the unprocessed image necessary for obtaining the processed preprocess image. This makes it possible in preprocessing to lower the amount of the data to be read from the input image for image processing purposes, whereby processing time and power consumption can be reduced. As such, the disclosed technology may be adapted advantageously to imaging apparatuses such as digital cameras, among others.

It is to be understood that while the disclosure has been described in conjunction with specific embodiments, it is evident that many alternatives, modifications and variations will become apparent to those skilled in the art in light of the foregoing description. Accordingly, it is intended that the present disclosure embrace all such alternatives, modifications and variations as fall within the spirit and scope of the appended claims.

The present disclosure contains subject matter related to that disclosed in Japanese Priority Patent Application JP 2011-007687 filed in the Japan Patent Office on Jan. 18, 2011, the entire content of which is hereby incorporated by reference.

What is claimed is:

1. An image processing apparatus comprising:
an image processing portion configured to perform image processing on an input image in such a manner that during said image processing, a size of an unprocessed image necessary for obtaining a processed image is varied depending on a position of said unprocessed image in said input image;
a coding portion configured to code the processed image output from said image processing portion; and
a preprocessing instruction portion configured such that before image processing and coding of said input image, said preprocessing instruction portion instructs said image processing portion to perform image processing on a preprocess image which is part of said input image and sends the processed preprocess image to said coding portion to acquire necessary information for coding said input image beforehand,
wherein said preprocessing instruction portion determines said preprocess image in such a manner as to reduce the size of said unprocessed image necessary for obtaining said processed preprocess image.

2. The image processing apparatus according to claim 1, wherein said image processing portion performs image processing including a process of bringing to the same size images having scaling factors varying with color components, a process of bringing to the same size images having scaling factors varying with image positions, a process of applying a filter having a tap count varying with image positions, and a process of correcting an image distortion caused by a lens.

3. The image processing apparatus according to claim 1, wherein said preprocessing instruction portion obtains a code amount as information necessary for coding.

4. The image processing apparatus according to claim 1, wherein said coding portion codes a previous value difference in a predetermined coding order; and
   during said preprocessing, said preprocessing instruction portion obtains beforehand the previous value for calculating said previous value difference.

5. The image processing apparatus according to claim 4, wherein said coding portion performs coding using the JPEG method; and
   said preprocessing instruction portion obtains beforehand direct current components during said preprocessing.

6. The image processing apparatus according to claim 1, wherein said preprocessing instruction portion uses said processed preprocess image as the size of a unit of processing for said coding.

7. The image processing apparatus according to claim 1, further comprising
   a reordering portion configured to reorder a coding order, wherein said coding portion codes said input image in an order different from a predetermined coding order; and
   said reordering portion reorders codes output from said coding portion into said predetermined coding order.

8. An image processing method comprising:
   performing image processing on an input image in such a manner that during said image processing, a size of an unprocessed image necessary for obtaining a processed image is varied depending on a position of said unprocessed image in said input image;
   coding the processed image following said image processing;
   prior to said coding, performing image processing and coding on a preprocess image which is part of said input image to acquire necessary information for coding said input image beforehand; and
   during said image processing and coding on the preprocess image, determining said preprocess image in such a manner as to reduce the size of said unprocessed image necessary for obtaining said processed preprocess image.

9. An imaging apparatus comprising:
   an imaging portion configured to generate a taken image;
   an image processing portion configured to perform image processing on said taken image in such a manner that during said image processing, a size of an unprocessed image necessary for obtaining a processed image is varied depending on a position of said unprocessed image in said taken image;
   a coding portion configured to code the processed image output from said image processing portion; and
   a preprocessing instruction portion configured such that before image processing and coding of said taken image, said preprocessing instruction portion instructs said image processing portion to perform image processing on a preprocess image which is part of said taken image and sends the processed preprocess image to said coding portion to acquire necessary information for coding said taken image beforehand,
   wherein said preprocessing instruction portion determines said preprocess image in such a manner as to reduce the size of said unprocessed image necessary for obtaining said processed preprocess image.

* * * * *